United States Patent
Su et al.

(10) Patent No.: US 12,363,417 B2
(45) Date of Patent: Jul. 15, 2025

(54) ELECTRONIC DEVICE

(71) Applicant: Lenovo (Beijing) Limited, Beijing (CN)

(72) Inventors: Yuefeng Su, Beijing (CN); Xiaojun Fan, Beijing (CN)

(73) Assignee: LENOVO (BEIJING) LIMITED, Beijing (CN)

( * ) Notice: Subject to any disclaimer, the term of this patent is extended or adjusted under 35 U.S.C. 154(b) by 204 days.

(21) Appl. No.: 18/176,722

(22) Filed: Mar. 1, 2023

(65) Prior Publication Data
US 2023/0283873 A1    Sep. 7, 2023

(30) Foreign Application Priority Data
Mar. 2, 2022   (CN) .................. 202210202584.5

(51) Int. Cl.
*H04N 23/57*   (2023.01)
*G03B 11/00*   (2021.01)
*H04N 23/55*   (2023.01)
*H04N 23/75*   (2023.01)
*H04N 23/76*   (2023.01)

(52) U.S. Cl.
CPC ............. *H04N 23/57* (2023.01); *G03B 11/00* (2013.01); *H04N 23/55* (2023.01); *H04N 23/75* (2023.01); *H04N 23/76* (2023.01)

(58) Field of Classification Search
CPC ........ H04N 23/57; H04N 23/55; H04N 23/75; H04N 23/76; H04N 23/54; G03B 11/00; G09F 9/33; G09F 9/35
See application file for complete search history.

(56) References Cited

U.S. PATENT DOCUMENTS
2022/0208897 A1*   6/2022   Yue ..................... H10K 59/122

FOREIGN PATENT DOCUMENTS
CN        101855663 A        10/2010
CN        215835423 U         2/2022

OTHER PUBLICATIONS

Under-Screen Photographing Assembly, and corresponding OLED screen and terminal device (Yue et al.) (Year: 2020).*

* cited by examiner

*Primary Examiner* — Yogesh K Aggarwal
(74) *Attorney, Agent, or Firm* — ANOVA LAW GROUP, PLLC (57) ABSTRACT

An electronic device includes a body having a first region and a second region at least partially adjacent to the first region; an optical sensor located at least partially within a range of light exposure in the first region for light-based imaging; and an adjuster configured to reduce relative visual perception differences between the first region and the second region of the electronic device.

10 Claims, 5 Drawing Sheets

ELECTRONIC DEVICE

CROSS-REFERENCE TO RELATED APPLICATION

This application claims priority to Chinese Patent Application No. 202210202584.5, filed on Mar. 2, 2022, the entire content of which is incorporated herein by reference.

TECHNICAL FIELD

The present disclosure relates to the technical field of electronic device technologies and, more particularly, to an electronic device having an imaging function.

BACKGROUND

As science and technology advance continuously, more and more electronic devices are widely used in daily life and work, thereby bringing great convenience to people, and becoming an indispensable and important tool for people today.

To satisfy the demand for imaging functions of electronic devices, many electronic devices are integrated with imaging functions. Electronic devices often implement the imaging functions by integrating optical sensors. When an optical sensor is integrated into an electronic device, a window needs to be formed for light to pass through into the electronic device, such that the light enters the optical sensor for imaging.

In electronic devices, due to the integration of optical sensors, there will be visual perception differences between a window area through which the light passes and other areas other than the window area, thereby affecting appearances of the electronic devices.

SUMMARY

One aspect of the present disclosure provides an electronic device. The electronic device includes a body having a first region and a second region at least partially adjacent to the first region; an optical sensor located at least partially within a range of light exposure in the first region for light-based imaging; and an adjuster configured to reduce relative visual perception differences between the first region and the second region of the electronic device.

BRIEF DESCRIPTION OF THE DRAWINGS

To more clearly illustrate the technical solution of the present disclosure, the accompanying drawings used in the description of the disclosed embodiments are briefly described below. The drawings described below are merely some embodiments of the present disclosure. Other drawings may be derived from such drawings by a person with ordinary skill in the art without creative efforts and may be encompassed in the present disclosure.

DETAILED DESCRIPTION OF THE EMBODIMENTS

In order to make the objectives, technical solutions, and advantages of the present disclosure clearer, the present disclosure will be further described in detail below with reference to the accompanying drawings. Obviously, the described embodiments are only some of the embodiments of the present disclosure, not all of the embodiments. Based on the embodiments of the present disclosure, all other embodiments obtained by those of ordinary skill in the art without creative efforts shall fall within the scope of the present disclosure.

Structures, proportions, sizes, etc. shown in the drawings of the specification are merely intended to be illustrative for embodiments of the present disclosure. They are provided for those who are familiar with the technology to understand and read, are not intended to limit the present disclosure with any implementation conditions or to provide technical substantive significance. Any modification of the structures, change of the proportions, or adjustment of the sizes shall still fall within the scope of the present disclosure without affecting the effect and purpose of the present disclosure.

Taking an electronic device having a display component as an example. The display component includes but is not limited to an LCD display or an OLED display. A typical design solution is to provide an imaging function through an optical sensor mounted under a display screen. The optical sensor under the display screen is often arranged in the following two methods.

In the first method, the optical sensor is arranged under the display screen, that is, the optical sensor is arranged on a side of the display screen facing away from a display surface of the display screen. A through-hole may be configured in an area of the display screen corresponding to the optical sensor through the display screen to prevent opaque structures of the display screen from blocking the light, such that the light enters the optical sensor for imaging.

In the second method, the optical sensor is arranged under the display screen, that is, the optical sensor is arranged on the side facing away from the display surface of the display screen. A recessed cavity with a depth smaller than a thickness of the display screen is formed on the side of the display screen facing away from the display surface of the display screen. The optical sensor is configured inside the recessed cavity to prevent the opaque structures of the display screen from blocking the light, such that the light enters the optical sensor for imaging.

Both of the above two methods will result in visual perception differences between an area of the optical sensor and other areas outside the area of the optical sensor in the electronic device.

In order to solve the above-described problems, one possible method is to maintain an integrity of the area of the optical sensor in the display screen, that is, getting rid of the through-hole or the recessed cavity. The opaque structures such as light-emitting sub-pixels located in the area of the optical sensor may be specially designed to allow the light to pass through. Although this method can solve the problem of the visual perception differences in different areas of the electronic device to a certain extent, it is technically difficult due to the need to improve the structure of the light-emitting sub-pixels of a display panel, which will cause display disparity, affect a display effect, degrade an imaging effect, and lower production yield.

In view of this, the present disclosure provides an electronic device. The electronic device includes: a body having a first region and a second region at least partially adjacent to the first region, an optical sensor located at least partially within a range of light exposure in the first region for light-based imaging, and an adjuster configured to reduce relative visual perception differences between the first region and the second region of the electronic device.

In the embodiments of the present disclosure, the adjuster of the electronic device may reduce the relative visual perception differences between the first region and the second region of the electronic device, such that both the first region and the second region provide a more consistent appearance.

To make the above objectives, features, and advantages of the present disclosure more obvious and comprehensible, the embodiments of the present disclosure are described in detail below with reference to the accompanying drawings.

Figure 1:
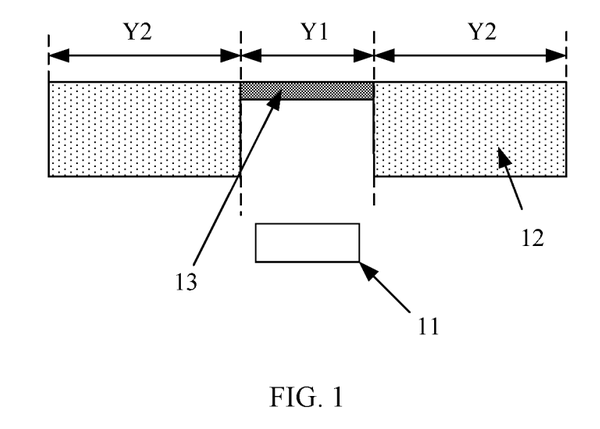
FIG. 1 is a schematic structural diagram of an exemplary electronic device according to some embodiments of the present disclosure.

FIG. 1 is a schematic structural diagram of an exemplary electronic device according to some embodiments of the present disclosure. As shown in FIG. 1, the electronic device includes a body 12 having a first region Y1 and a second region Y2 at least partially adjacent to the first region Y1, an optical sensor 11 located at least partially within a range of light exposure in the first region Y1 for light-based imaging, and an adjuster 13 configured to reduce relative visual perception differences between the first region Y1 and the second region Y2 of the electronic device. The optical sensor 11 may be directly located at least partially within the light irradiation range in the first region Y1 for light-based imaging. Alternatively, another structural component may be configured between the optical sensor 11 and the body 12. In this case, a light passing through the first region indirectly irradiates at least a part of the optical sensor 11 through another structural component. In some embodiments, the relative visual perception differences refer to visual perception differences by viewers under a visible light.

In the electronic device having an imaging function, to facilitate the light to irradiate on the optical sensor 11 for imaging, it is necessary to ensure that the light can transmit through the first region Y1. On the other hand, to conceal structural components inside the electronic device, a transmittance of the second region Y2 to visible light needs to be low. Thus, the transmittance of the first region Y1 to visible light is greater than the transmittance of the second region Y2 to visible light, thereby causing the relative visual perception differences between the first region Y1 and the second region Y2.

In the embodiments of the present disclosure, the adjuster 13 is configured to reduce the relative visual perception differences between the first region Y1 and the second region Y2 of the electronic device, such that both the first region Y1 and the second region Y2 provide the more consistent appearance.

In some embodiments, as shown in FIG. 1, the second region Y2 surrounds the first region Y1. In some other embodiments, the second region Y2 only surrounds a portion of the first region Y1. At least a portion of the optical sensor 11 is configured opposite to the first region Y1. For example, an orthogonal projection of the optical sensor 11 on the body 12 is located at least partially in the first region Y1. In some embodiments, the orthogonal projection of the optical sensor 11 on the body 12 is located entirely in the first region Y1. Thus, the optical sensor 11 is located entirely in the light irradiation range passing through the first region Y1, thereby ensuring image quality.

Figure 2:
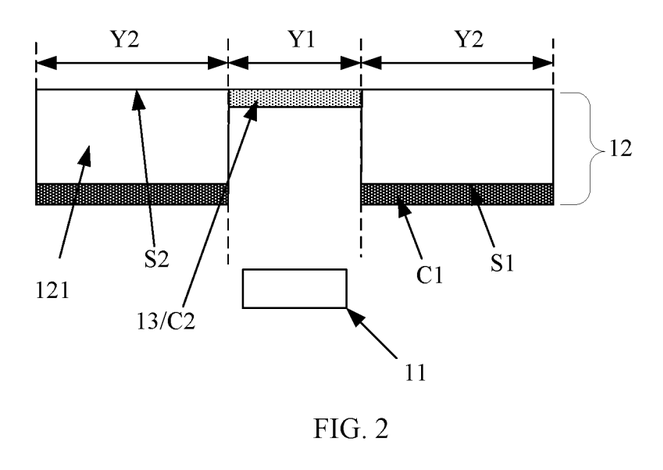
FIG. 2 is a schematic structural diagram of another exemplary electronic device according to some embodiments of the present disclosure.

FIG. 2 is a schematic structural diagram of another exemplary electronic device according to some embodiments of the present disclosure. In addition to the electronic device in FIG. 1, the electronic device in FIG. 2 includes the body 12 that includes a substrate 121 and a first material C1. The substrate 121 includes a first surface S1 and a second surface S2 arranged opposite to each other. The first surface S1 faces toward to the optical sensor 11. The first material C1 is disposed on the first surface S1 corresponding to the second region Y2. The substrate 121 is a transparent plate, including but not limited to a glass or a transparent plastic plate.

The adjuster 13 includes a first adjuster component. The first adjuster component includes a second material C2. The second material C2 is disposed on a light incident side of the optical sensor 11. In an incident light direction of the optical sensor 11, the second material C2 at least covers a portion of the first region Y1. The second material C2 is used to reduce the relative visual perception differences between the first region Y1 and the second region Y2 of the electronic device.

The transmittance of the first material C1 to visible light is smaller than the transmittance of the second material C2 to visible light. The first material C1 has a small transmittance to visible light to conceal the structural components located under the second region of the electronic device. The second material C2 has a great transmittance to visible light, such that the light irradiates on the optical sensor 11 through the first region Y1 for the optical sensor 11 to form an image.

In the electronic device provided by the embodiments of the present disclosure, the second material C2 satisfies a condition of covering the entire first region Y1. That is, the second material C2 covers the entire first region Y1 or almost the entire first region Y1. Thus, it is ensured that the second material C2 effectively reduces the relative visual perception differences between the first region Y1 and the second region Y2.

The second material C2 is of a same type as the first material C1. For example, both are ink material or another coating material. The transmittance of the second material C2 to visible light is greater than the transmittance of the first material C1 to visible light.

In some embodiments, the first material C1 is an ink material. The transmittance of the first material C1 to visible light is lower than that of the second material C2 to conceal the structural components of the electronic device disposed under the second region Y2. In some embodiments, the transmittance of the first material C1 to visible light is not greater than about 5%.

In some embodiments, the second material C2 is another ink material. The transmittance of the second material C1 to visible light is greater than that of the first material C1 to ensure that the transmittance of the first region Y1 to visible light is relatively large, thereby facilitating the optical sensor 11 for imaging. In some embodiments, the transmittance of the second material C2 to visible light is in a range approximately between 5% and 98%. On one hand, the greater the transmittance of the second material C2 to visible light, the greater the transmittance of the first region Y1 to visible light, the more desirable the imaging effect of the optical sensor 11, and the greater the relative visual perception differences between the first region Y1 and the second region Y2. On the other hand, the smaller the transmittance of the second material C2 to visible light, the smaller the transmittance of the first region Y1 to visible light, the less desirable the imaging effect of the optical sensor 11, and the smaller the relative visual perception differences between the first region Y1 and the second region Y2. It is discovered that, when the transmittance of the second material C2 to visible light is configured to be in the range approximately between 10% and 50%, it is ensured that the optical sensor 11 can have a desirable imaging effect, and at the same time, the relative visual perception differences between the first region Y1 and the second region Y2 can be effectively reduced.

Figure 3:
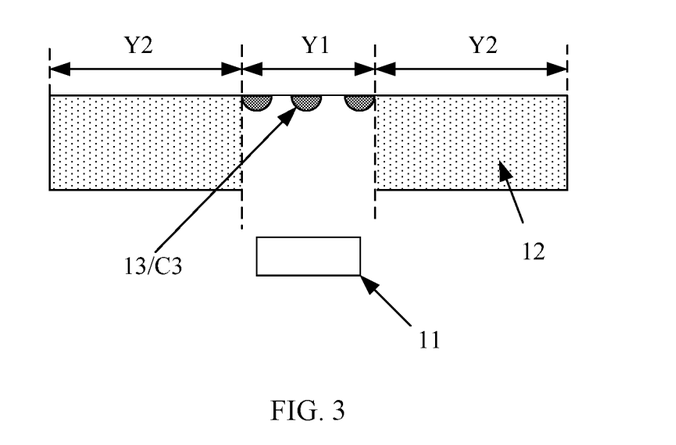
FIG. 3 is a schematic structural diagram of another exemplary electronic device according to some embodiments of the present disclosure.

FIG. 3 is a schematic structural diagram of another exemplary electronic device according to some embodiments of the present disclosure. In addition to the electronic device in FIG. 1 and FIG. 2, the electronic device in FIG. 3 includes the adjuster 13 that includes a second adjuster component. The second adjuster component includes a plurality of adjustment structures separated by gaps. The plurality of adjustment structures include a third material C3. The third material C3 is used to reduce reflection of visible light. For example, the third material C3 is capable of absorbing visible light to reduce the reflection of visible light. As previously described, the portion of the body 12 located in the second region Y2 includes the first material C1. The first material C1 is capable of absorbing visible light to reduce the reflection of visible light in the second region Y2, thereby concealing the structural components disposed under the second region Y2 in the electronic device. As such, the reflection of visible light may be reduced by configuring the third material C3, the appearance may be relatively more consistent in the first region Y1 and the second region Y2, and the relative visual perception differences between the first region Y1 and the second region Y2 may be reduced.

In some embodiments, the electronic device includes at least one of the first adjuster component or the second adjuster component. That is, the electronic device includes one of the first adjuster component and the second adjuster component, or includes both the first adjuster component and the second adjuster component at the same time. As shown in FIG. 3, the third material C3 can transmit infrared light. The third material C3 can absorb visible light and transmit the infrared light. The third material C3 may be an ink material.

An image formed by the optical sensor 11 includes a first partial image corresponding to the adjuster components and a second partial image corresponding to the gaps. The electronic device includes a processor (not shown in FIG. 3). The processor performs a visible light information compensation process on the first partial image based on the second partial image. The first partial image may be an infrared image, including brightness information and excluding visible light color information. The second partial image may be a visible light image, including both the brightness information and the visible light color information. The processor is capable of converting the first partial image into a third partial image. The third partial image includes the brightness information of the first partial image and the visible light color information of the second partial image corresponding to the first partial image. Thus, the visible light information compensation can be performed on the first partial image based on the second partial image to obtain a visible light combined image combining the first partial image and the second partial image. For example, the processor may superimpose the first partial image and the third partial image to obtain a final overall visible light image.

The smaller the size of the plurality of adjustment structures, the higher the accuracy of performing the visible light information compensation process on the first partial image based on the second partial image. On one hand, the larger the gaps between adjacent adjustment structures, the greater the transmittance of the first region Y1 to visible light, and the more desirable the imaging quality. However, the larger gaps result in a larger portion of the first region Y1 that is not covered by the plurality of adjustment structures. Because the portion of the first region Y1 that is not covered by the plurality of adjustment structures substantially reflects visible light, the relative visual perception differences between the first region Y1 and the second region Y2 degrade. On the other hand, the smaller the gaps between adjacent adjustment structures, the smaller the transmittance of the first region Y1 to visible light, and the less desirable the imaging quality. In this case, the smaller gaps result in a smaller portion of the first region Y1 that is not covered by the plurality of adjustment structures. Because the portion of the first region Y1 that is not covered by the plurality of adjustment structures substantially reflects visible light, the relative visual perception differences between the first region Y1 and the second region Y2 improve. The applicant found that a maximum line width is in a range approximately between 2 μm and 500 μm. When the gap between adjacent adjustment structures is 2 to 10 times the line width, the imaging quality is desirable, and at the same time, the relative visual perception differences between the first region Y1 and the second region Y2 is substantially reduced.

Figure 4:
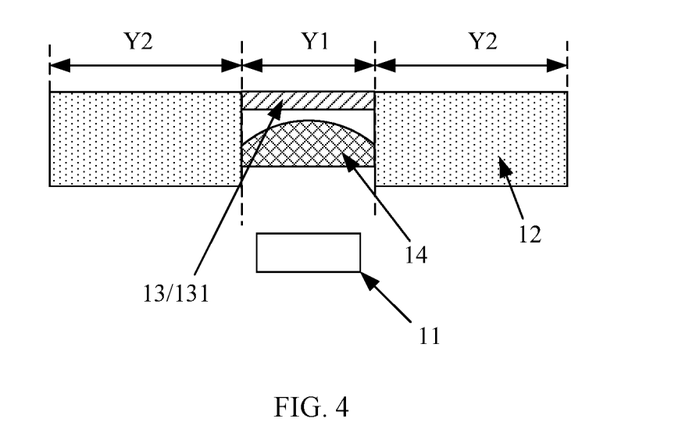
FIG. 4 is a schematic structural diagram of another exemplary electronic device according to some embodiments of the present disclosure.

FIG. 4 is a schematic structural diagram of another exemplary electronic device according to some embodiments of the present disclosure. In addition to the electronic device in previous drawings, the electronic device in FIG. 4 includes the adjuster 13 that includes a third adjuster component 133. The third adjuster component 133 is at least partially located in the first region Y1. The third adjuster component 133 is used to reduce the reflection of visible light toward the first region Y1 in the first region Y1 of the electronic device. An optical component 14 is disposed on the light incident side of the optical sensor 11 to adjust the light incident on the optical sensor 11. The optical component 14 is located between the third adjuster component 133 and the optical sensor 11. The optical component 14 may be a lens assembly including at least one lens for improving the imaging quality of the optical sensor 11. The third adjuster component 133 includes a polarizer or a quarter wave plate. An optical deflection state based adjustment reduces the reflection of the first region Y1 to visible light to reduce the relative visual perception differences between the first region Y1 and the second region Y2.

Through configuring the third adjuster component 133, the reflection of the first region Y1 to incident visible light can be reduced, thereby reducing the relative visual perception differences between the first region Y1 and the second region Y2. Moreover, through configuring the third adjuster component 133 on the light incident side of the optical component 14, the reflection of the optical component 14 to visible light can be reduced, thereby further reducing the relative visual perception differences between the first region Y1 and the second region Y2.

In some other embodiments, the third adjuster component 133 may be disposed between the optical component 14 and the optical sensor 11.

In the embodiments of the present disclosure, the adjuster 13 is illustrated in the drawings of various embodiments of the electronic device including one of the first adjuster component, the second adjuster component, and the third adjuster component. Based on actual requirements, the adjuster 13 may include at least one of the first adjuster component, the second adjuster component, or the third adjuster component.

Figure 5:
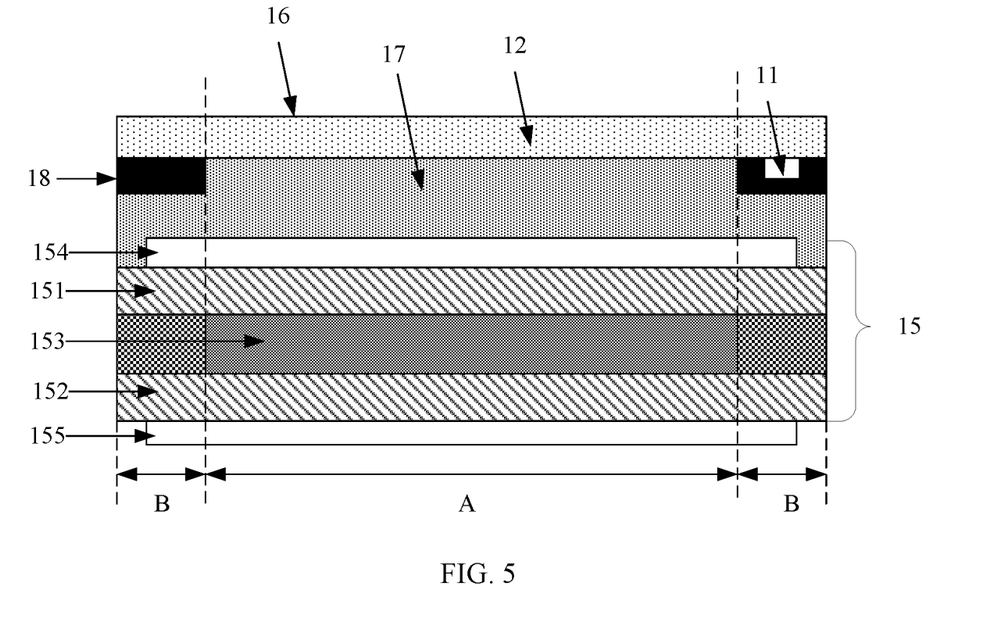
FIG. 5 is a schematic structural diagram of another exemplary electronic device according to some embodiments of the present disclosure.

FIG. 5 is a schematic structural diagram of another exemplary electronic device according to some embodiments of the present disclosure. In addition to the electronic device in previous drawings, the electronic device in FIG. 5 includes a display 15 and a first cover 16 disposed on a light-emitting side of the display 15. The body 12 includes the first cover 16. The display 15 includes a display region A and a peripheral region B surrounding the display region A. The optical sensor 11 is located between the first cover 16 and the display 15 and in the peripheral region B. Referring to the previous drawings and FIG. 5, the display region A includes the first region Y1 and at least a portion of the second region Y2.

The first cover 16 and the display 15 are bonded and fixed by an optical glue 17. As shown in FIG. 5, the optical sensor 11 is integrated between the first cover 16 and the display 15. The optical sensor 11 shares a space between the first cover 16 and the display 15 with the optical glue 17 without adding to a thickness of the electronic device, thereby facilitating a thinner and lighter design of the electronic device. The optical sensor 11 is configured in the peripheral region B, thereby eliminating the need for drilling a hole in the display 15. Thus, a manufacturing process is simplified, and a production yield is increased.

In some embodiments, the first cover 16 is used as the substrate 121. A shield 18 is configured on a side of the first cover 16 facing toward the display 15 to cover a portion of the peripheral region B. The shield 18 is used to conceal the structural components of the electronic device under the peripheral region B. The shield 18 may be the first material C1.

To prevent light emitted from the display 15 from being reflected by a light exiting surface of the first cover 16 to irradiate on the optical sensor 11 and degrade the imaging quality, the shield 18 is configured to surround sidewalls of the optical sensor 11. The shield 18 may further surround a bottom of the optical sensor 11 facing toward the display 15.

As shown in FIG. 5, the display 15 includes: a first substrate 151 and a second substrate 152 arranged opposite to each other, and a display component 153 disposed between the first substrate 151 and the second substrate 152.

In some embodiments, as shown in FIG. 5, the display 15 is an LCD display. The display component 153 includes a liquid crystal component. The display 15 further includes an upper polarizer 154 disposed on a surface of the first substrate 151 facing toward the first cover 16, and lower polarizer 155 disposed on a surface of the second substrate 152 facing away from the first cover 16.

In some embodiments, the display 15 is not limited to the LCD display, and may be an OLED display.

Figure 6:
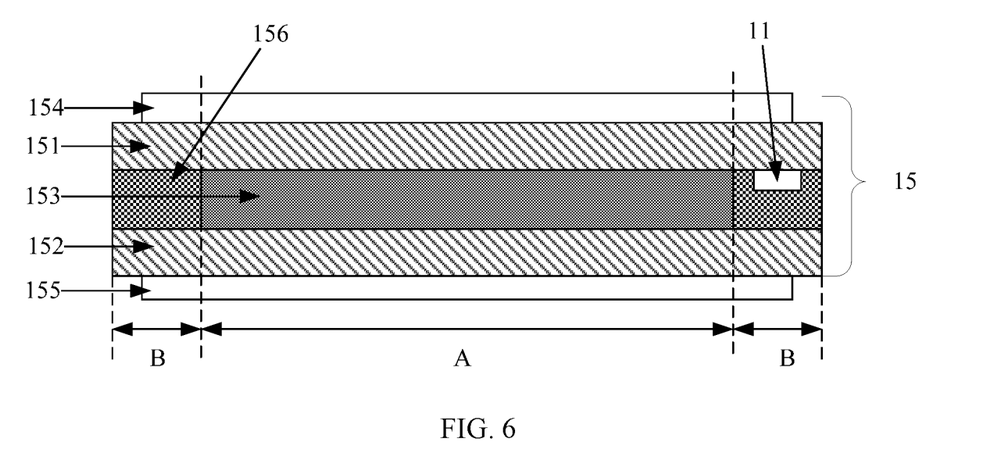
FIG. 6 is a schematic structural diagram of another exemplary electronic device according to some embodiments of the present disclosure.

FIG. 6 is a schematic structural diagram of another exemplary electronic device according to some embodiments of the present disclosure. In addition to the electronic device in previous drawings, the electronic device in FIG. 6 includes a display 15. The display 15 includes a display region A and a peripheral region B surrounding the display region A.

As shown in FIG. 6, the display 15 includes a first substrate 151 and a second substrate 152 arranged in parallel with each other, and a sealer 156 disposed between the first substrate 151 and the second substrate 152. The sealer 156 is located in the peripheral region B surrounding the display component 153. The first substrate 151 is located on the light-emitting side of the display component 153. The body 12 include the first substrate 151. The optical sensor 11 is located between the sealer 156 and the first substrate 151 and in the peripheral region B.

As shown in FIG. 6, the optical sensor 11 is disposed in a space between the first substrate 151 and the second substrate 152 without adding to the thickness of the display 15, thereby facilitating the thinner and lighter design of the electronic device. The optical sensor 11 is configured in the peripheral region B without the need for drilling a hole in the display. Thus, the manufacturing process is simplified, and the production yield is increased.

To prevent the light emitted from the display 15 from being reflected by a surface of the electronic device located at the light-emitting side of the display 15 to irradiate on the optical sensor 11 and degrade the imaging quality, the sealer 156 is configured to surround sidewalls of the optical sensor 11. The sealer 156 may further surround the bottom of the optical sensor 11 facing toward the display 15.

In some embodiments, the first substrate 151 is used as the substrate 121. The sealer 156 is configured on a side of the first substrate 151 facing toward the display 15 to cover a portion of the peripheral region B. The sealer 156 is used to bond the first substrate 151 and the second substrate 152 together. When the electronic device includes the first cover 16, the body 12 further includes first cover 16. The shield 18 is configured on a surface of the first cover 16 facing toward the display 15. The shield 18 includes an opening corresponding to a region of the optical sensor 11 to allow an incident light to irradiate on the optical sensor 11.

In some embodiments, the optical sensor 11 is connected with a sensor circuit board through a flexible circuit board (FPC). The display 15 includes a main circuit board on a side opposite to the light-emitting side. The sensor circuit board is attached to the main circuit board to connect between the optical sensor 11 and the main circuit board. Unlike conventional camera packaging structure in which the optical sensor 11 and the sensor circuit board are integrally packaged, in the embodiments of the present disclosure, the optical sensor 11 and the sensor circuit board are packaged separately. As such, the independently packaged optical sensor 11 has a relatively small size. When being configured in the peripheral region B, the independently packaged optical sensor 11 reduces a width of the peripheral region B. The sensor circuit board is attached to the main circuit board. The sensor circuit board may be located in a portion of the display region A corresponding to the sensor circuit board, may be located in a portion of the peripheral region B corresponding to the main circuit board, or may be located partially in the portion of the display region A corresponding to the sensor circuit board and partially in the portion of the peripheral region B corresponding to the main circuit board. Because the main circuit board is located on the side of the display 15 opposite to the light-emitting side, the sensor circuit board does not block the light emitted from the display 15 regardless of whether the sensor circuit board is located in the display region A. Thus, there is no need to expand the width of the peripheral region B to accommodate the sensor circuit board, thereby facilitating a narrow peripheral region B.

Figure 7:
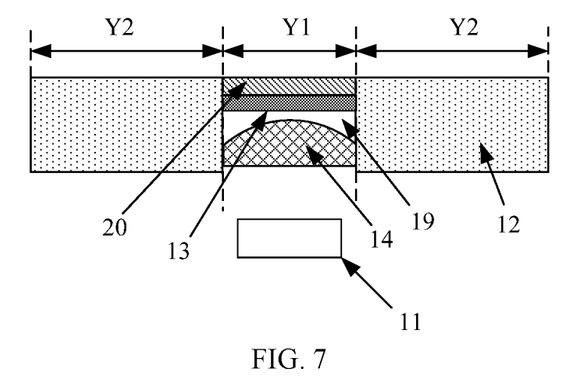
FIG. 7 is a schematic structural diagram of another exemplary electronic device according to some embodiments of the present disclosure.

FIG. 7 is a schematic structural diagram of another exemplary electronic device according to some embodiments of the present disclosure. In addition to the electronic device in previous drawings, the electronic device in FIG. 7 includes a through-hole 19 passing through the body 12. The through-hole 19 is located in the first region Y1. The through-hole 19 includes a second cover 20 therein. The second cover 20 is coplanar with a surface (an upper surface of the body 12 in FIG. 7) of the body 12 facing away from the optical sensor 11. That is, the second cover 20 is coplanar or nearly coplanar with the surface of the body 12 facing away from the optical sensor 11. The optical sensor 11 includes the optical component 14 on the light incident side thereof for adjusting the light incident on the optical sensor 11. The optical component 14 is located between the second cover 20 and the optical sensor 11. The optical component 14 is at least partially located inside the through-hole 19.

The adjuster 13 is located between the second cover 20 and the optical sensor 11 and is located on a surface of at least one of the second cover 20, the optical component 14, or the body 12. Sidewalls of the through-hole 19 may be provided with focus adjustment threads for adjusting a fixed position of the optical component 14 inside the through-hole 19 as needed when the optical component 14 is installed inside the through-hole 19.

In some embodiments, as shown in FIG. 7, the through-hole 19 is configured to increase the transmittance of the first region Y1 to visible light, thereby improving the imaging quality of the optical sensor 11. Moreover, the optical component 14 may be configured inside the through-hole 19 to save space for accommodating the optical component 14 without adding to the thickness of the electronic device. IN general, the body 12 includes a glass substrate. When the electronic device has a thin thickness, the thickness of the glass substrate is also thin. Compared with a process of forming non-penetrating recesses, it is less difficult to form the though-hole 19 on the thin substrate, thereby reducing production cost.

In some embodiments, as shown in FIG. 7, the through-hole 19 is configured to flatten the surface of the body 12 facing away from the optical sensor 11, conceal the through-hole 19, and reduce the relative visual perception differences between the first region Y1 and the second region Y2.

In some embodiments, as shown in FIG. 7, the adjuster 13 is located on a surface of the second cover 20. Because the adjuster 13 is located between the second cover 20 and the optical sensor 11, when the adjuster 13 is located on the surface of the second cover 20, the adjuster 13 is located on the surface of the second cover 20 facing toward the optical sensor 11.

Figure 8:
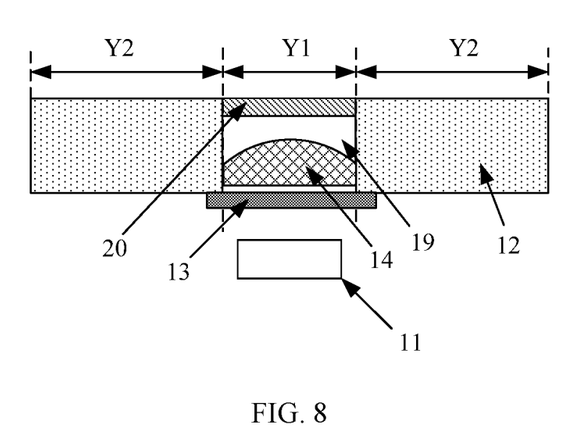
FIG. 8 is a schematic structural diagram of another exemplary electronic device according to some embodiments of the present disclosure.

FIG. 8 is a schematic structural diagram of another exemplary electronic device according to some embodiments of the present disclosure. In addition to the electronic device in previous drawings, the electronic device in FIG. 8 includes the adjuster 13 located on the surface of the body 12. Because the adjuster 13 is located between the second cover 20 and the optical sensor 11, when the adjuster 13 is located on the surface of the second cover 20, the adjuster 13 is located on the surface of the second cover 20 facing toward the optical sensor 11.

Figure 9:
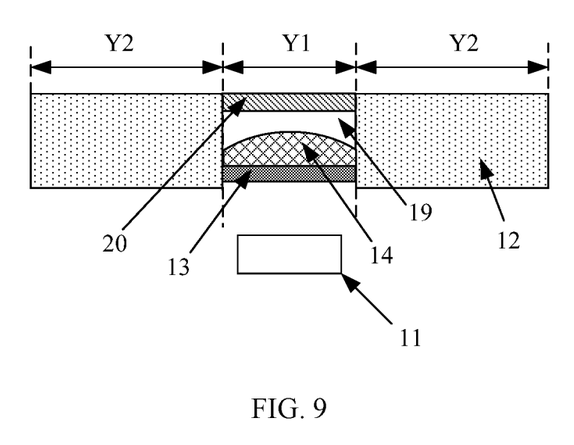
FIG. 9 is a schematic structural diagram of another exemplary electronic device according to some embodiments of the present disclosure.

FIG. 9 is a schematic structural diagram of another exemplary electronic device according to some embodiments of the present disclosure. In addition to the electronic device in previous drawings, the electronic device in FIG. 9 includes the adjuster 13 located on the surface of the optical component 14. Because the adjuster 13 is located between the second cover 20 and the optical sensor 11, when the adjuster 13 is located on the surface of the optical component 14, the adjuster 13 may be located on the surface of the optical component 14 facing toward the optical sensor 11, or may be located on the surface of the optical component 14 facing toward the second cover 20.

In some embodiments, as shown in FIGS. 7-9, the adjuster 13 is located on a surface of at least one of the second cover 20, the optical component 14, or the body 12. As previously described, the adjuster 13 includes at least one of the first adjuster component, the second adjuster component, or the third adjuster component. When the adjuster 13 includes one of the first adjuster component, the second adjuster component, and the third adjuster component, the adjuster 13 may be configured on the surface of one of the second cover 20, the optical component 14, and the body 12. When the adjuster 13 includes two or more of the first adjuster component, the second adjuster component, and the third adjuster component, the adjuster 13 may be configured on the surface of one of the second cover 20, the optical component 14, and the body 12, or may be configured on multiple surfaces of the second cover 20, the optical component 14, and the body 12.

At least the surface of the second cover assembly 20 is provided with the adjuster 13 to effectively conceal the structural components under the cover assembly 20 and effectively reduce the relative visual perception differences between the first region Y1 and the second region Y2.

Figure 10:
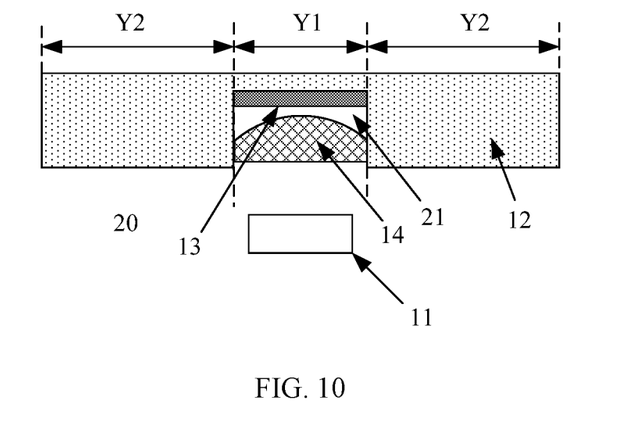
FIG. 10 is a schematic structural diagram of another exemplary electronic device according to some embodiments of the present disclosure.

FIG. 10 is a schematic structural diagram of another exemplary electronic device according to some embodiments of the present disclosure. Unlike the electronic device in FIG. 7, the electronic device in FIG. 10 includes the body 12 that includes a recess 21 on a surface of the body 12 facing toward the optical sensor 11. The recess 21 is located in the first region Y1. A depth of the recess 21 is smaller than the thickness of the body 12. The optical component 14 is configured on the light incident side of the optical sensor 11 to adjust the light incident on the optical sensor 11. At least a portion of the optical component 14 is located in the recess 21. The adjuster 13 located between a surface of the recess 21 facing toward the optical sensor 11 and the optical sensor 11, and is located on a surface of at least one of a bottom of the recess 21, the optical component 14, or the body 12.

At least the bottom surface of the recess 21 is provided with the adjuster 13 to effectively conceal the structural components under the cover 20 and effectively reduce the relative visual perception differences between the first region Y1 and the second region Y2.

Sidewalls of the recess 21 may be provided with focus adjustment threads for adjusting a fixed position of the optical component 14 inside the recess 21 as needed when the optical component 14 is installed inside the recess 21.

Compared with the above method of forming the through hole 19, in the method shown in FIG. 10, a portion of the body 12 at the bottom of the recess 21 is reserved without the need for the second cover 20. Thus, the surface of the body 12 facing away from the optical sensor 11 can be flattened, and the integrity of the surface can be preserved.

In some embodiments, as shown in FIG. 10, the adjuster 13 is located on a bottom surface of the recess 21. Referring to FIGS. 7-9, the adjuster 13 is arranged to be located on the surface of at least one of the bottom of the recess 21, the optical component 14, or the body 12. The description thereof is omitted.

In the embodiments of the present disclosure, the electronic device includes, but is not limited to, an electronic device having an imaging function such as a notebook computer, a tablet computer, and a mobile phone.

In the embodiments of the present disclosure, the electronic device includes the adjuster 13 for reducing the relative visual perception differences between the first region Y1 and the second region Y2, and concealing the optical sensor 11.

When the electronic device includes the display 15, the optical sensor 11 is configured in the peripheral region B of the electronic device. There is no need for forming a through-hole or a recess on the display 15, and there is no interference to the display region A of the display 15. Thus, a screen-to-body ratio can be increased, and the manufacturing process is simplified.

Various embodiments in the specification are described in a progressive manner, and each embodiment focuses on the differences from other embodiments, and for the same and similar parts between the various embodiments, reference can be made to each other.

In the description of the present disclosure, it should be understood that the orientation or positional relationship indicated by the terms "upper", "lower", "top", "bottom", "inside" and "outside" is based on the orientation or positional relationship shown in the drawings, is merely for the convenience of describing the present disclosure and simplifying the description, and does not indicate or imply that the referred device or element must have a specific orientation, be constructed and operated in a specific orientation, and therefore cannot be understood as limitations of the present disclosure. When a component is said to be "connected" to another component, it may be directly connected to the other component or there may be an intermediate component at the same time.

It should also be noted that in the specification, relational terms such as first and second are used only to distinguish one entity or operation from another, and do not necessarily require or imply that there is such actual relationship or order between those entities or operations. Moreover, the terms "comprising," "including" or any other variation thereof are intended to encompass non-exclusive inclusion such that a process, method, article or device comprising a list of elements includes not only those elements, but also includes not explicitly listed or other elements inherent to such a process, method, article or apparatus. Without further limitation, an element qualified by the phrase "comprising a . . . " does not preclude the presence of additional identical elements in a process, method, article or apparatus that includes the element.

The above description of the disclosed embodiments enables those skilled in the art to implement or use the present disclosure. Various modifications to the embodiments will be obvious to those skilled in the art, and the general principles defined herein can be implemented in other embodiments without departing from the spirit or scope of the present disclosure. Therefore, this application will not be limited to the embodiments shown in the specification, but should conform to the broadest scope consistent with the principles and novelties disclosed in the specification.

What is claimed is:

1. An electronic device, comprising:
a body having a first region and a second region at least partially adjacent to the first region;
an optical sensor located at least partially within a range of light exposure in the first region for light-based imaging;
a processor; and
an adjuster configured to reduce relative visual perception differences between the first region and the second region of the electronic device;
wherein:
the adjuster includes an adjuster component including a plurality of adjustment structures separated by gaps;
the plurality of adjustment structures includes a material for reducing reflection of visible light;
the material allows an infrared light to pass through;
an image formed by the optical sensor includes a first partial image corresponding to the plurality of adjustment structures and a second partial image corresponding to the gaps; and
the processor is configured to perform a visible light information compensation process on the first partial image based on the second partial image.

2. The electronic device according to claim 1, wherein:
the material is a first material, and the adjuster component is a first adjuster component;
the body includes a substrate having a first surface facing toward the optical sensor and a second surface arranged opposite to the first surface, and a second material located on a portion of the first surface corresponding to the second region;
the adjuster further includes a second adjuster component including a second third material that is located on a light incident side of the optical sensor, and covers at least a portion of the first region in an incident light direction of the optical sensor; and
the third material is used to reduce the relative visual perception differences between the first region and the second region of the electronic device.

3. The electronic device according to claim 2, wherein:
the third material satisfies a condition of covering the first region entirely;
the second material and the third material are of a same type; and
a transmittance of the third material to visible light is greater than a transmittance of the second material to visible light.

4. The electronic device according to claim 1, wherein:
the adjuster component is a first adjuster component;
the adjuster further includes a second adjuster component at least partially located in the first region;
the second adjuster component is used to reduce the flection of visible light toward the first region in the first region of the electronic device;
an optical component is disposed on the light incident side of the optical sensor to adjust light incident on the optical sensor; and
the second adjuster component is located between the optical component and the optical sensor or the optical component is located between the second adjuster component and the optical sensor.

5. The electronic device according to claim 1, further comprising:
a display and a cover located on a light-emitting side of the display;

wherein:
the body includes the cover;
the display includes a display region and a peripheral region surrounding the display region; and
the optical sensor is located between the cover and the display and in the peripheral region.

6. The electronic device according to claim 1, further comprising:
a display including a display region and a peripheral region surrounding the display region;
wherein:
the display includes:
a first substrate and a second substrate that are arranged to satisfy a parallel condition; and
a display component and a sealer that are located between the first substrate and the second substrate, the sealer being located in the peripheral region and surrounding the display component; and
the first substrate is located on a light-emitting side of the display component, the body includes the first substrate, and the optical sensor is located between the sealer and the first substrate and in the peripheral region.

7. The electronic device according to claim 1, further comprising:
a through-hole passing through the body, the through-hole being located in the first region;
wherein:
a cover is provided in the through-hole;
the cover and a surface of the body facing away from the optical sensor satisfy a coplanar relationship;
the optical component is disposed on the light incident side of the optical sensor to adjust the light incident on the optical sensor;
the optical component is located between the cover and the optical sensor;
the optical component is at least partially located inside the through-hole; and
the adjuster is located between the cover and the optical sensor and on a surface of at least one of cover, the optical component, or the body.

8. The electronic device according to claim 1, wherein:
the body includes a recess configured on a surface facing toward the optical sensor, the recess being located in the first region, and a depth of the recess being smaller than a thickness of the body;
the optical component is disposed on the light incident side of the optical sensor to adjust the light incident on the optical sensor, the optical component being at least partially located in the recess; and
the adjuster is located between a surface of the recess facing toward the optical sensor and the optical sensor, and is located on a surface of at least one of a bottom of the recess, the optical component, or the body.

9. An electronic device, comprising:
a body having a first region and a second region at least partially adjacent to the first region;
an optical sensor located at least partially within a range of light exposure in the first region for light-based imaging;
an adjuster configured to reduce relative visual perception differences between the first region and the second region of the electronic device; and
a through-hole passing through the body, the through-hole being located in the first region, a cover being provided in the through-hole;
wherein:
the cover and a surface of the body facing away from the optical sensor satisfy a coplanar relationship;
the optical component is disposed on the light incident side of the optical sensor to adjust the light incident on the optical sensor;
the optical component is located between the cover and the optical sensor;
the optical component is at least partially located inside the through-hole; and
the adjuster is located between the cover and the optical sensor and on a surface of at least one of cover, the optical component, or the body.

10. An electronic device, comprising:
a body having a first region and a second region at least partially adjacent to the first region;
an optical sensor located at least partially within a range of light exposure in the first region for light-based imaging;
an adjuster configured to reduce relative visual perception differences between the first region and the second region of the electronic device; and
a display including a display region and a peripheral region surrounding the display region;
wherein:
the display includes:
a first substrate and a second substrate that are arranged to satisfy a parallel condition; and
a display component and a sealer that are located between the first substrate and the second substrate, the sealer being located in the peripheral region and surrounding the display component; and
the first substrate is located on a light-emitting side of the display component, the body includes the first substrate, and the optical sensor is located between the sealer and the first substrate and in the peripheral region.

* * * * *